United States Patent
Patgar et al.

(10) Patent No.: US 10,740,157 B2
(45) Date of Patent: Aug. 11, 2020

(54) CACHE LOAD BALANCING IN A VIRTUAL INPUT/OUTPUT SERVER

(71) Applicant: INTERNATIONAL BUSINESS MACHINES CORPORATION, Armonk, NY (US)

(72) Inventors: Yogesh Patgar, Bangalore (IN); Girish Shrigiri, Gulbarga (IN); Monica Lemay, Cedar Park, TX (US); Sougata Sarkar, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 130 days.

(21) Appl. No.: 15/997,731

(22) Filed: Jun. 5, 2018

(65) Prior Publication Data
US 2019/0370082 A1 Dec. 5, 2019

(51) Int. Cl.
| G06F 9/455 | (2018.01) |
| G06F 9/48 | (2006.01) |
| G06F 9/50 | (2006.01) |
| G06F 11/30 | (2006.01) |
| G06F 11/34 | (2006.01) |

(52) U.S. Cl.
CPC .......... *G06F 9/5083* (2013.01); *G06F 9/455* (2013.01); *G06F 9/45533* (2013.01); *G06F 9/45558* (2013.01); *G06F 9/48* (2013.01); *G06F 9/485* (2013.01); *G06F 9/4806* (2013.01); *G06F 9/4843* (2013.01); *G06F 9/4875* (2013.01); *G06F 9/4881* (2013.01); *G06F 9/50* (2013.01); *G06F 9/505* (2013.01); *G06F 9/5005* (2013.01); *G06F 9/5016* (2013.01); *G06F 9/5027* (2013.01); *G06F 9/5088* (2013.01); *G06F 11/3037* (2013.01); *G06F 11/3485* (2013.01); *G06F 2009/4557* (2013.01); *G06F 2009/45575* (2013.01); *G06F 2009/45579* (2013.01); *G06F 2009/45587* (2013.01); *G06F 2009/45591* (2013.01); *G06F 2201/81* (2013.01)

(58) Field of Classification Search
CPC .. G06F 9/455; G06F 9/45533; G06F 9/45558; G06F 2009/4557; G06F 2009/45575; G06F 2009/45587; G06F 9/48; G06F 9/4806; G06F 9/4843; G06F 9/485; G06F 9/486; G06F 9/4875; G06F 9/4881; G06F 9/50; G06F 9/5005; G06F 9/5027; G06F 9/505; G06F 9/5083; G06F 9/5088
See application file for complete search history.

(56) References Cited

U.S. PATENT DOCUMENTS

| 8,615,676 B2 | 12/2013 | Bender et al. |
| 9,280,380 B2 | 3/2016 | Tsirkin |
| 9,461,867 B1 | 10/2016 | Atia et al. |

(Continued)

*Primary Examiner* — Charles M Swift
(74) *Attorney, Agent, or Firm* — Cantor Colburn LLP; Joseph Petrokaitis (57) ABSTRACT

Methods, systems, and computer program products for performing cache load balancing between multiple virtual input/output servers (VIOSs) are provided. Aspects include monitoring a utilization level for a cache in each of at least two VIOSs and determining that an imbalance exists between the utilization levels of the at least two VIOSs. Aspects also include transferring at least one logical storage unit between the at least two VIOSs, wherein the transferring reduces the imbalance.

15 Claims, 6 Drawing Sheets

600

(56) References Cited

U.S. PATENT DOCUMENTS

| | | | |
|---|---|---|---|
| 9,973,433 B2 | 5/2018 | Matzek et al. | |
| 2012/0246517 A1* | 9/2012 | Bender | G06F 11/0712 714/45 |
| 2012/0303594 A1* | 11/2012 | Mewhinney | G06F 11/1482 707/692 |
| 2013/0346973 A1* | 12/2013 | Oda | G06F 9/4856 718/1 |
| 2014/0082165 A1* | 3/2014 | Marr | G06F 9/5044 709/222 |
| 2016/0197986 A1* | 7/2016 | Chambliss | G06F 9/45558 709/213 |
| 2017/0012896 A1 | 1/2017 | Matzek et al. | |
| 2017/0024261 A1* | 1/2017 | Atluri | G06F 9/45558 |
| 2017/0024316 A1* | 1/2017 | Park | G06F 12/0815 |
| 2017/0054632 A1 | 2/2017 | Atia et al. | |
| 2017/0147399 A1* | 5/2017 | Cropper | G06F 9/4856 |
| 2017/0235612 A1 | 8/2017 | Chen et al. | |
| 2018/0307522 A1* | 10/2018 | Wu | H04L 41/0886 |

\* cited by examiner

| Lun id | Cache utilization | Block IO(64KB) per sec | LPAR | VIOS |
|---|---|---|---|---|
| Lun1 | 10% | 7000 | Lpar1 | Vios2 |
| Lun2 | 10% | 5000 | Lpar1 | Vios2 |
| Lun3 | 20% | 3000 | Lpar2 | Vios1 |
| Lun4 | 20% | 4000 | Lpar2 | Vios1 |
| Lun5 | 0% | 100 | Lpar2 | Vios1 |
| Lun6 | 40% | 4000 | Lpar3 | Vios1 |
| Lun7 | 20% | 3000 | Lpar3 | Vios1 |

CACHE LOAD BALANCING IN A VIRTUAL INPUT/OUTPUT SERVER

BACKGROUND

The invention relates generally to operating virtual input/output servers (VIOSs) and, more specifically, to performing cache load balancing between multiple VIOSs.

Currently, Virtual Small Computer System Interfaces (VSCI) do not provide a load sharing mechanism between multiple Virtual Input/Output Servers (VIOS) when it multiple VIOS are used. Traditionally, since the resources allocated to a given VIOS can be increased to handle larger workloads, load balancing between VIOS have not been developed.

SUMMARY

According to an embodiment, a system for performing cache load balancing between multiple VIOSs is provided. The system includes a memory having computer readable computer instructions, and a processor for executing the computer readable instructions. The computer readable instructions include instructions for monitoring a utilization level for a cache in each of at least two VIOSs and determining that an imbalance exists between the utilization levels of the at least two VIOSs. The computer readable instructions also include instructions for transferring at least one logical storage unit between the at least two VIOSs, wherein the transferring reduces the imbalance.

According to another embodiment, a method for performing cache load balancing between multiple VIOSs is provided. The method includes monitoring a utilization level for a cache in each of at least two VIOSs and determining that an imbalance exists between the utilization levels of the at least two VIOSs. The method also includes transferring at least one logical storage unit between the at least two VIOSs, wherein the transferring reduces the imbalance.

According to a further embodiment, a computer program product is provided. The computer program product includes a computer readable storage medium having program instructions embodied therewith. The computer readable storage medium is not a transitory signal per se. The program instructions are executable by a computer processor to cause the computer processor to perform a method. The method includes monitoring a utilization level for a cache in each of at least two VIOS s and determining that an imbalance exists between the utilization levels of the at least two VIOSs. The method also includes transferring at least one logical storage unit between the at least two VIOSs, wherein the transferring reduces the imbalance.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, in which:

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Figure 1:
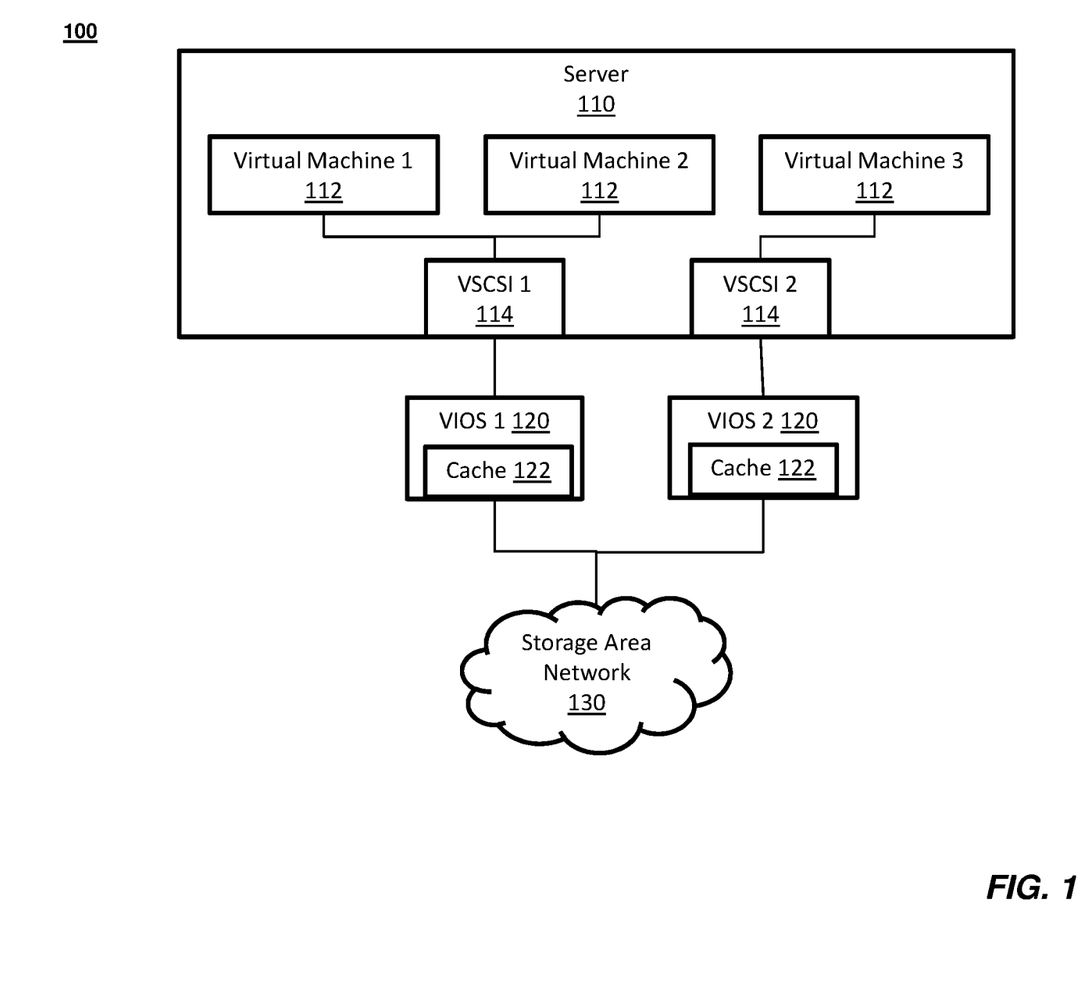
FIG. 1 depicts a system upon which performing cache load balancing between multiple VIOSs may be implemented according to one or more embodiments of the present invention.

Referring now to FIG. 1, a system 100 upon which performing cache load balancing between multiple VIOSs may be implemented according to one or more embodiments of the present invention is shown. As illustrated, the system 100 includes a server 110 that includes a plurality of virtual machines 112. The server 110 also includes multiple Virtual Small Computer System Interfaces (VSCIs) that are used by the virtual machines 112 to communicate with Virtual Input/Output Servers (VIOSs) 120. Each VIOS 120 includes a cache 122 that is used to buffer data being transmitted between the virtual machines 112 and the storage area network 130. In exemplary embodiments, the VIOSs 120 and/or the server 110 may be implemented as a computer-based system, such as the one shown and described with reference to FIG. 2.

In exemplary embodiments, as the workloads of the virtual machines 112 vary, the utilization levels of the caches 122 of the VIOSs 120 can become imbalanced. As the amount of data being transmitted between a particular virtual machine increases, the cache of the VIOS utilized by that virtual machine will also increase. When this happens, the cache of that VIOS can become a bottleneck and slow down the performance of one or more virtual machines using that particular VIOS. Accordingly, when the utilization of a cache 122 increases above a threshold level, for example 90%, a potential cache load balance may exist. Once a potential cache load balance is detected, one or more workloads, in the form of logical storage units, can be moved from a first VIOS to a second VIOS.

Figure 2:
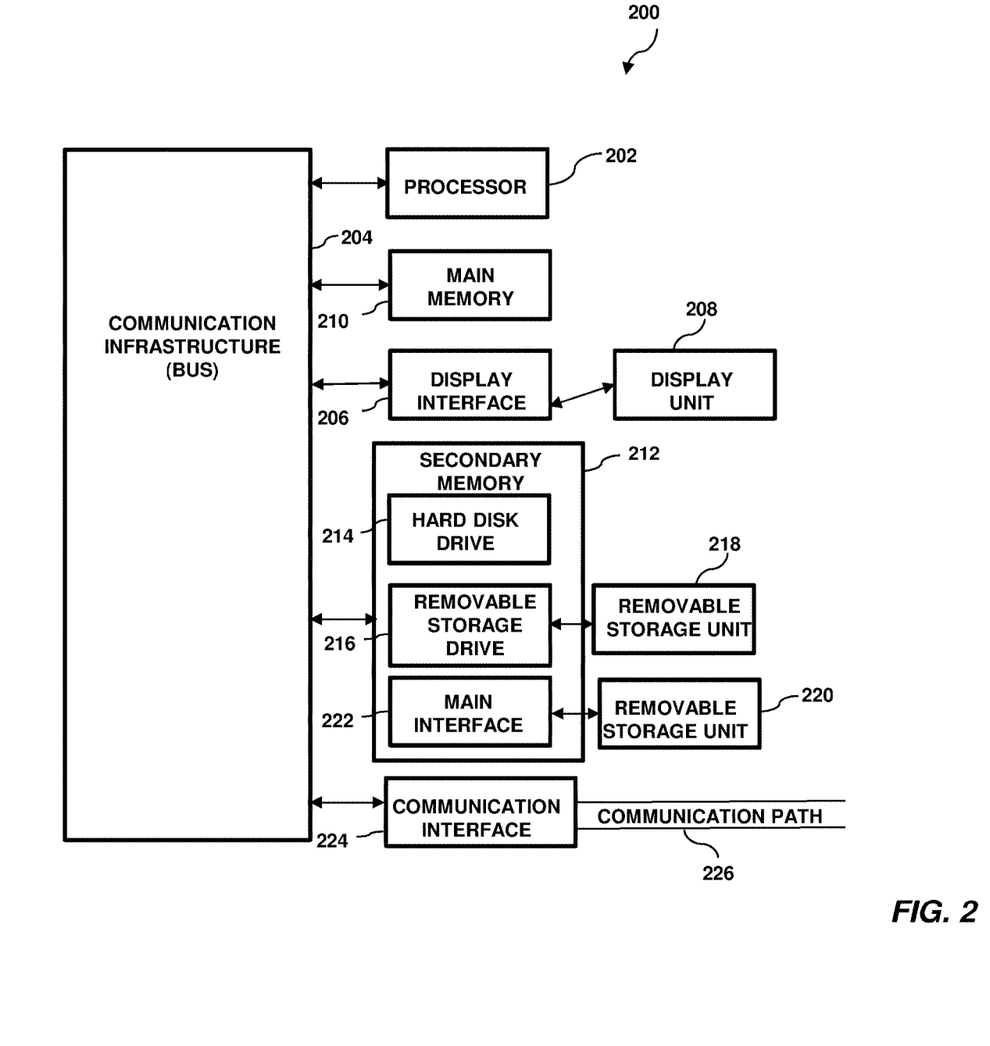
FIG. 2 depicts an exemplary computer system capable of implementing one or more embodiments of the present invention.

Turning now to FIG. 2, a high-level block diagram showing an example of a computer-based system 200 useful for implementing one or more embodiments of the invention is shown. Although one exemplary computer system 200 is shown, computer system 200 includes a communication path 226, which connects computer system 200 to additional systems and may include one or more wide area networks (WANs) and/or local area networks (LANs) such as the internet, intranet(s), and/or wireless communication network(s). Computer system 200 and additional systems are in communication via communication path 226, (e.g., to communicate data between them).

Computer system 200 includes one or more processors, such as processor 202. Processor 202 is connected to a communication infrastructure 204 (e.g., a communications bus, cross-over bar, or network). Computer system 200 can include a display interface 206 that forwards graphics, text, and other data from communication infrastructure 204 (or from a frame buffer not shown) for display on a display unit 208. Computer system 200 also includes a main memory 210, preferably random access memory (RAM), and may also include a secondary memory 212. Secondary memory 212 may include, for example, a hard disk drive 214 and/or a removable storage drive 216, representing, for example, a floppy disk drive, a magnetic tape drive, or an optical disk drive. Removable storage drive 216 reads from and/or writes to a removable storage unit 218 in a manner well known to those having ordinary skill in the art. Removable storage unit 218 represents, for example, a floppy disk, a compact disc, a magnetic tape, or an optical disk, etc. which is read by and written to by a removable storage drive 216. As will be appreciated, removable storage unit 218 includes a computer readable medium having stored therein computer software and/or data.

In some alternative embodiments of the invention, secondary memory 212 may include other similar means for allowing computer programs or other instructions to be loaded into the computer system. Such means may include, for example, a removable storage unit 220 and an interface 222. Examples of such means may include a program package and package interface (such as that found in video game devices), a removable memory chip (such as an EPROM or PROM) and associated socket, and other removable storage units 220 and interfaces 222 which allow software and data to be transferred from the removable storage unit 220 to computer system 200.

Computer system 200 may also include a communications interface 224. Communications interface 224 allows software and data to be transferred between the computer system and external devices. Examples of communications interface 224 may include a modem, a network interface (such as an Ethernet card), a communications port, or a PCM-CIA slot and card, etc. Software and data transferred via communications interface 224 are in the form of signals which may be, for example, electronic, electromagnetic, optical, or other signals capable of being received by communications interface 224. These signals are provided to communications interface 224 via communication path (i.e., channel) 226. Communication path 226 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 210 and secondary memory 212, removable storage drive 216, and a hard disk installed in hard disk drive 214. Computer programs (also called computer control logic) are stored in main memory 210, and/or secondary memory 212. Computer programs may also be received via communications interface 224. Such computer programs, when run, enable the computer system to perform the features of the present disclosure as discussed herein. In particular, the computer programs, when run, enable processor 202 to perform the features of the computer system. Accordingly, such computer programs represent controllers of the computer system.

Figure 3:
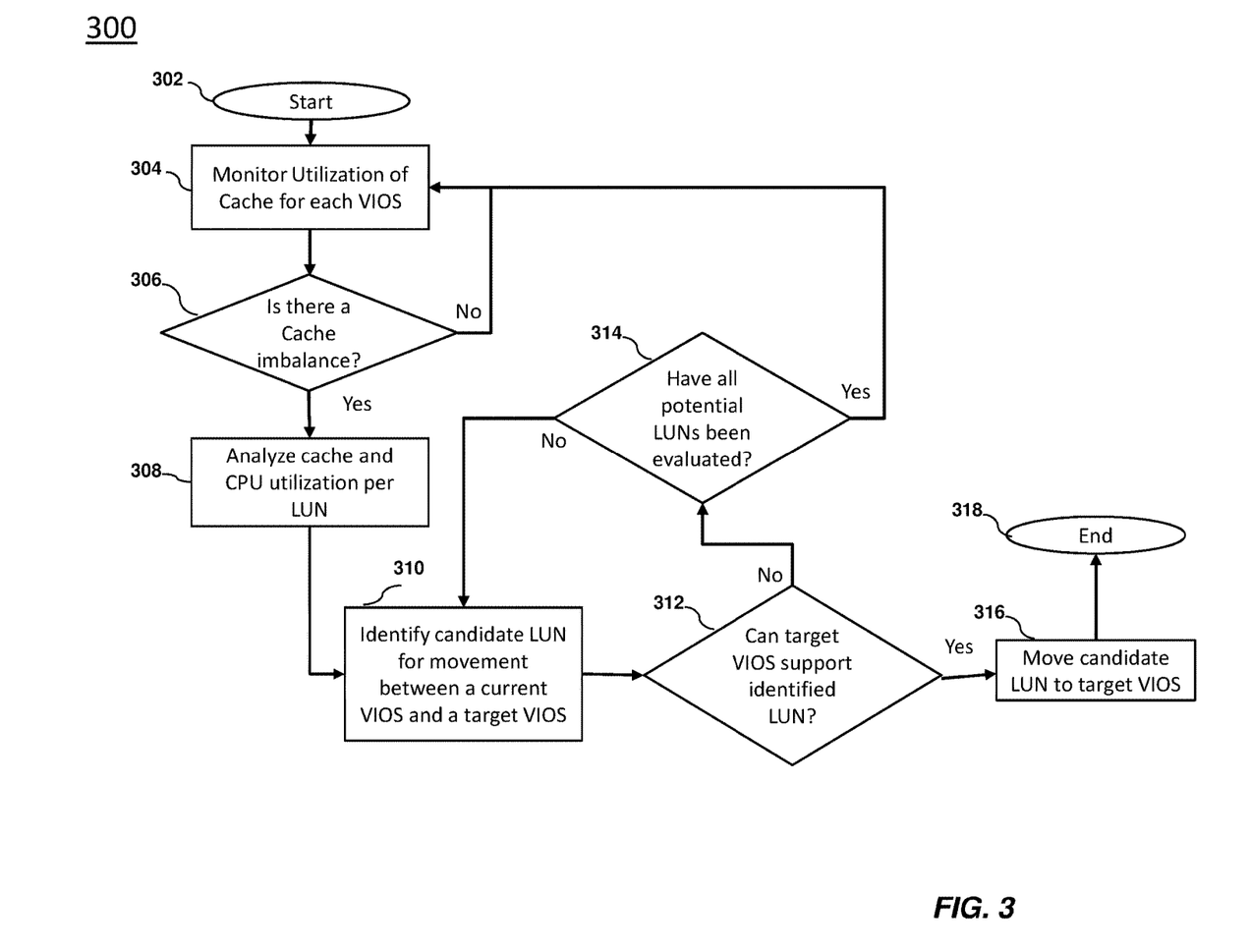
FIG. 3 depicts a flow diagram of a method for performing cache load balancing between multiple VIOSs according to one or more embodiments of the present invention.

Turning now to FIG. 3, a flow diagram of a method 300 for performing cache load balancing between multiple VIOSs in accordance with an embodiment is shown. The method 300 begins at block 302 and monitors the utilization of the cache for each of a plurality of VIOSs, as shown at block 304. Next, as shown at decision block 306, the method 300 includes determining if a cache imbalance exists between the VIOSs. If no cache imbalance exists, the method 300 returns to block 304 and continues to monitor the utilization of the cache for each of a plurality of VIOSs. Otherwise, the method 300 proceeds to block 308 and analyzes the cache and CPU utilization of each of the plurality of VIOSs. Next, as shown at block 310, the method 300 includes identifying a candidate logical unit (LUN) for movement between a current VIOS and a target VIOS. In exemplary embodiments, the candidate LUN is a LUN on the current VIOS that has the highest cache utilization of the plurality of VIOSs. The candidate LUN can be the LUN that is utilizing the highest percentage of the cache of the current VIOS.

Continuing with reference to FIG. 3, as shown at decision block 312, the method 300 includes determining if the target VIOS can support the identified candidate LUN. In exemplary embodiments, the determination of whether the target VIOS can support the identified candidate LUN is based on one or more characteristic of both the target VIOS and the identified candidate LUN. The one or more characteristics of the identified candidate LUN include a storage block input/output rate and a storage block size and the one or more characteristics of the target VIOS includes an available storage space and a processor speed. If the target VIOS can support the identified candidate LUN, method 300 proceeds to block 316 and the identified candidate LUN is moved from the current VIOS to the target VIOS. Otherwise, the method 300 proceeds to decision block 314 and determines whether all of the potential LUNs have been evaluated. If all of the potential LUNs, that is each of the LUNs on the current VIOS, have been evaluated, the method 300 proceeds to block 304 and continues to monitor the utilization of the cache for each of a plurality of VIOSs. Otherwise, the method 300 proceeds to block 310 and identifies another candidate LUN.

Figure 4:
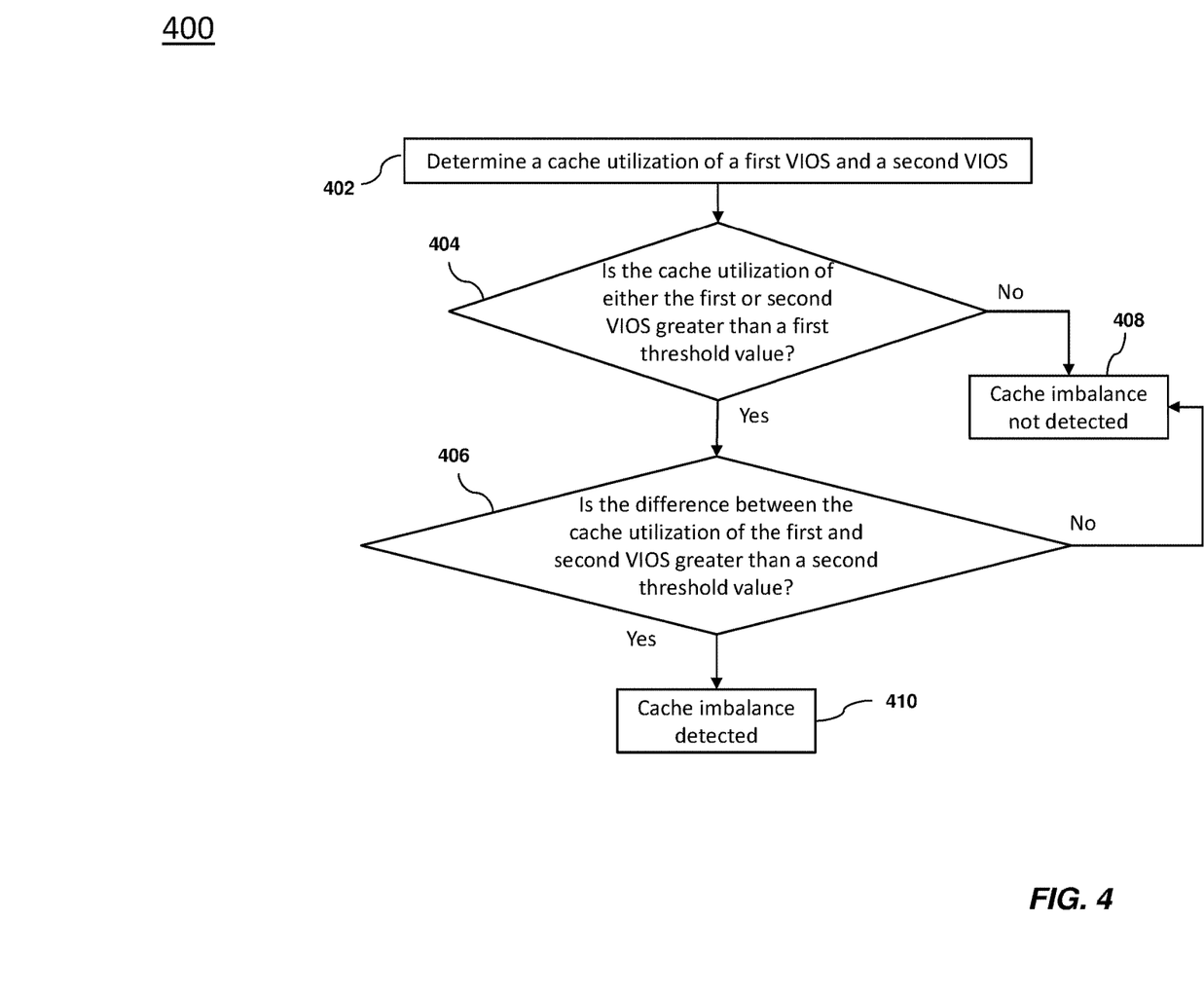
FIG. 4 depicts a flow diagram of a method for identifying a cache load imbalance between multiple VIOSs according to one or more embodiments of the present invention.

Turning now to FIG. 4, a flow diagram of a method 400 for identifying a cache load imbalance between multiple VIOSs in accordance with an embodiment is shown. As shown at block 402, the method 400 includes determining a cache utilization of a first VIOS and a second VIOS. Next, as shown at decision block 404, the method 400 includes determining whether the cache utilization of either the first VIOS or the second VIOS is greater than a first threshold value, for example 90%. If neither the cache utilization of the first VIOS or the second VIOS is greater than a first threshold value, the method 400 proceeds to block 408 and a cache imbalance is not detected. Otherwise, the method 400 proceeds to decision block 406 and determines if the difference between the cache utilization of the first VIOS and second VIOS greater than a second threshold value, for example 30%. If the difference between the cache utilization of the first VIOS and second VIOS is not greater than the second threshold value, the method 400 proceeds to block 408 and a cache imbalance is not detected. Otherwise, the method 400 proceeds to block 410 and a cache imbalance is detected.

Figure 5:
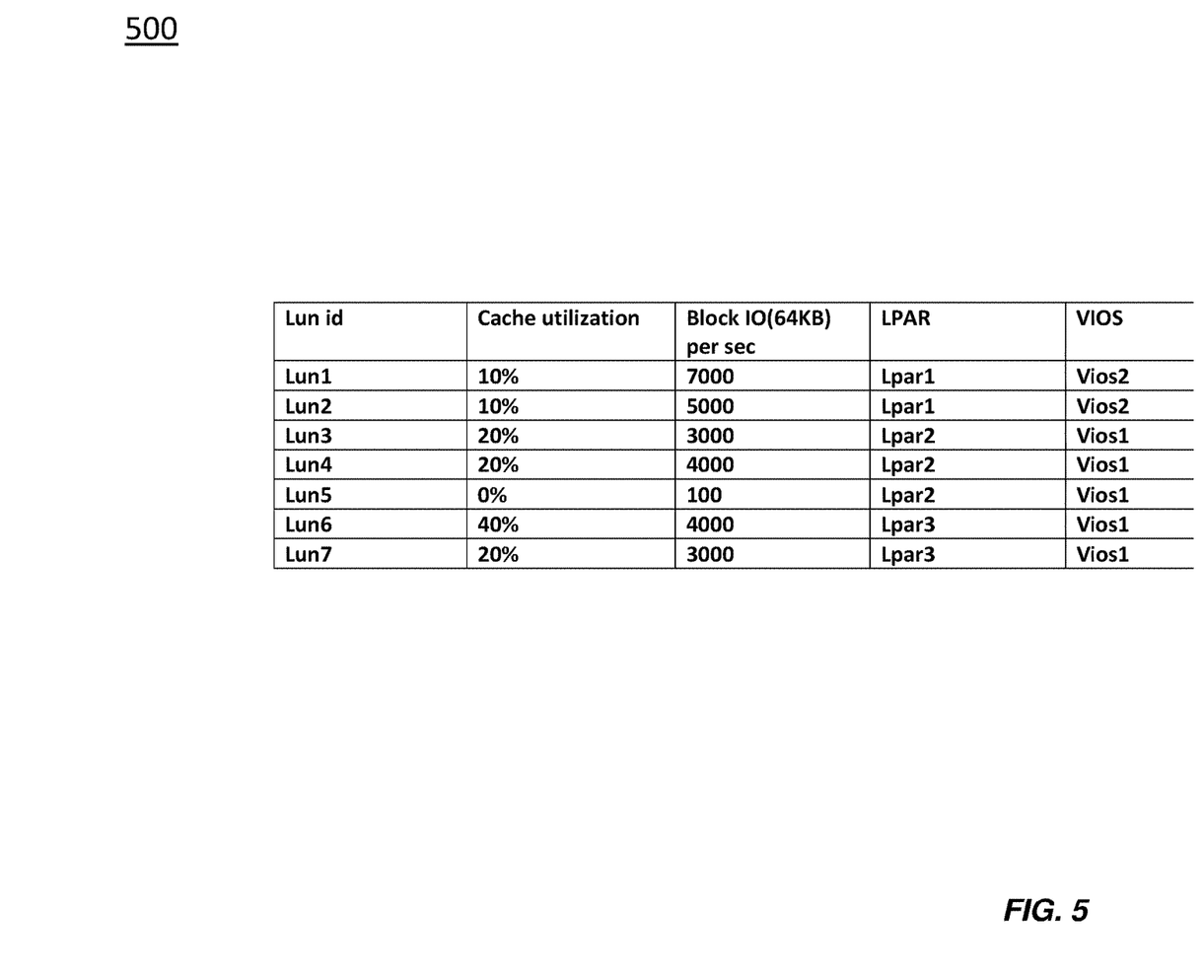
FIG. 5 depicts a table illustrating cache load data for multiple VIOSs according to one or more embodiments of the present invention.

Referring now to FIG. 5 a table illustrating cache load data for multiple VIOSs according to one or more embodiments of the present invention is shown. As illustrated, table 500 includes LUN information for two VIOSs, VIOS 1 and VIOS 2. The cache utilization for VIOS 1 is 100% and the cache utilization for VIOS 2 is 20%. Accordingly, a cache imbalance exists between VIOS 1 and VIOS 2. In exemplary embodiments, the first candidate LUN to consider moving will be LUN 6, since it is utilizing 40% of the cache pool of VIOS 1.

In exemplary embodiments, it is determined if LUN 6 can be moved from VIOS 1 to VIOS 2 based on a size of the cache that LUN 6 is using, for example, if the cache pool of VIOS 1 is 100 G, then the size of the cache that LUN 6 is using is 40 MB. LUN 6 has a block I/O rate of 4000 blocks/second that CPU of VIOS 1 processes 40000 blocks per second and at a processing speed of 3.2 GHz. Therefore, LUN 6 would require 0.05 CPU units, (4000*40000)/3200000000=0.05, and 40 MB of storage to be available on VIOS 2 in order to be moved.

In exemplary embodiments, the monitoring algorithms parse through entire list of LUN on VIOS 1, if the high utilizing LUN, LUN 6, can't be moved on to VIOS 2, while parsing through the list of LUN it will maintain failure results table—which then can be used to determine if there is option to swap the LUNS between the VIOSs.

Figure 6:
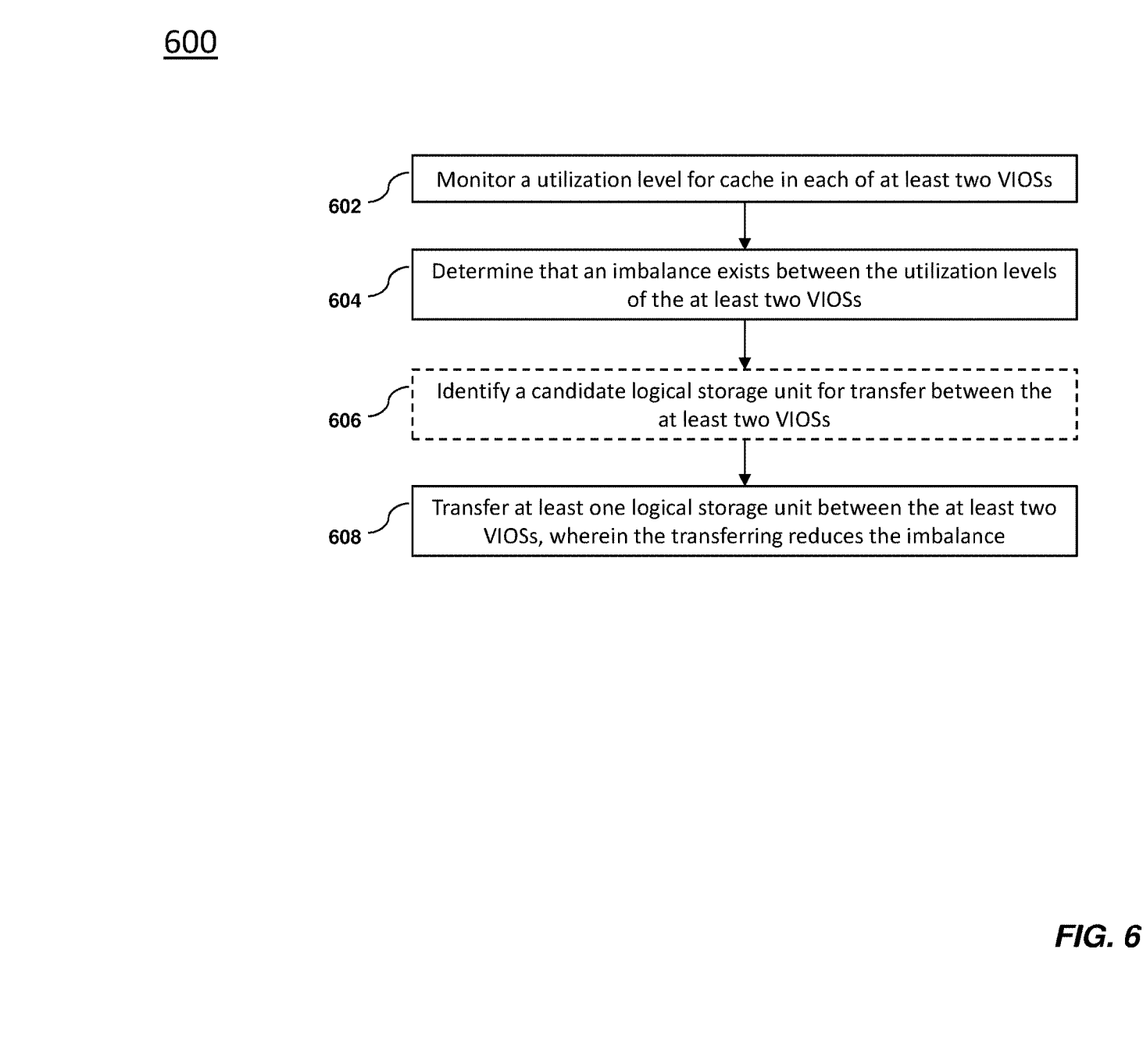
FIG. 6 depicts a flow diagram of another method for performing cache load balancing between multiple VIOSs according to one or more embodiments of the present invention.

FIG. 6 depicts a flow diagram of another method for performing cache load balancing between multiple VIOSs according to one or more embodiments of the present invention. As shown at block 602, the method 600 includes monitoring a utilization level for cache in each of at least two VIOSs. Next, as shown at block 604, the method 600 includes determining that an imbalance exists between the utilization levels of the at least two VIOSs. In exemplary embodiments, determining that the imbalance exists between the utilization levels of the at least two VIOSs includes determining that the utilization level for the cache of at least one of the at least two VIOSs is greater than a first threshold level. Optionally, the method 600 includes identifying a candidate logical storage unit for transfer between the at least two VIOSs, as shown at block 606. In exemplary embodiments, the candidate logical storage unit is determined to be a logical storage unit that is utilizing the largest percentage of the cache of a VIOS of the at least two VIOSs that has a higher utilization level. Next, as shown at block 608, the method 600 includes transferring at least one logical storage unit between the at least two VIOSs, wherein the transferring reduces the imbalance.

Technical benefits of the disclosed methods and systems include allowing Virtual Small Computer System Interfaces (VSCI) to provide a load sharing mechanism between multiple Virtual Input/Output Servers (VIOS) when it multiple VIOS are used. Balancing the cache urination loads among multiple VIOSs will result in better IO performance for the entire system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for performing cache load balancing between multiple virtual input/output servers (VIOSs), comprising:
    monitoring a utilization level for a cache in each of at least two VIOSs;
    determining that an imbalance exists between the utilization levels of the at least two VIOSs; and
    transferring at least one logical storage unit between the at least two VIOSs, wherein the transferring reduces the imbalance,
    wherein determining that the imbalance exists between the utilization levels of the at least two VIOSs comprises:
        determining that the utilization level for the cache of the at least one of the at least two VIOSs is greater than a first threshold level; and
        determining that the utilization level for the cache of the at least one of the at least two VIOSs exceeds the utilization level for the cache of another one of the at least two VIOSs by at least a second threshold level.

2. The method of claim 1, further comprising identifying a candidate logical storage unit for transfer between the at least two VIOSs.

3. The method of claim 2, wherein the candidate logical storage unit is determined to be a logical storage unit that is utilizing a largest percentage of the cache of a VIOS of the at least two VIOSs that has a higher utilization level.

4. The method of claim 2, further comprising determining whether a destination VIOS of the at least two VIOSs can service the candidate logical storage unit based on one or more characteristics of the logical storage unit and one or more characteristics of the destination VIOS.

5. The method of claim 4, wherein the one or more characteristics of the logical storage unit includes a storage block input/output rate and a storage block size and the one or more characteristics of the destination VIOS includes an available storage space and a processor speed.

6. A system for performing cache load balancing between multiple VIOSs, comprising:
   a memory having computer readable instructions; and
   a processor for executing the computer readable instructions, the computer readable instructions including instructions for:
      monitoring a utilization level for a cache in each of at least two VIOSs;
      determining that an imbalance exists between the utilization levels of the at least two VIOSs; and
      transferring at least one logical storage unit between the at least two VIOSs, wherein the transferring reduces the imbalance,
      wherein determining that the imbalance exists between the utilization levels of the at least two VIOSs comprises:
         determining that the utilization level for the cache of the at least one of the at least two VIOSs is greater than a first threshold level; and
         determining that the utilization level for the cache of the at least one of the at least two VIOSs exceeds the utilization level for the cache of another one of the at least two VIOSs by at least a second threshold level.

7. The system of claim 6, wherein the computer readable instructions also include instructions for identifying a candidate logical storage unit for transfer between the at least two VIOSs.

8. The system of claim 7, wherein the candidate logical storage unit is determined to be a logical storage unit that is utilizing a largest percentage of the cache of a VIOS of the at least two VIOSs that has a higher utilization level.

9. The system of claim 7, wherein the computer readable instructions also include instructions for determining whether a destination VIOS of the at least two VIOSs can service the candidate logical storage unit based on one or more characteristics of the logical storage unit and one or more characteristics of the destination VIOS.

10. The system of claim 9, wherein the one or more characteristics of the logical storage unit includes a storage block input/output rate and a storage block size and the one or more characteristics of the destination VIOS includes an available storage space and a processor speed.

11. A computer program product comprising a computer readable storage medium having program instructions embodied therewith the program instructions executable by a computer processor to cause the computer processor to perform a method, comprising:
    monitoring a utilization level for a cache in each of at least two VIOSs;
    determining that an imbalance exists between the utilization levels of the at least two VIOSs; and
    transferring at least one logical storage unit between the at least two VIOSs, wherein the transferring reduces the imbalance,
    wherein determining that the imbalance exists between the utilization levels of the at least two VIOSs comprises:
        determining that the utilization level for the cache of the at least one of the at least two VIOSs is greater than a first threshold level; and
        determining that the utilization level for the cache of the at least one of the at least two VIOSs exceeds the utilization level for the cache of another one of the at least two VIOSs by at least a second threshold level.

12. The computer program product of claim 11, wherein the method further comprises identifying a candidate logical storage unit for transfer between the at least two VIOSs.

13. The computer program product of claim 12, wherein the candidate logical storage unit is determined to be a logical storage unit that is utilizing a largest percentage of the cache of a VIOS of the at least two VIOSs that has a higher utilization level.

14. The computer program product of claim 12, wherein the method further comprises determining whether a destination VIOS of the at least two VIOS s can service the candidate logical storage unit based on one or more characteristics of the logical storage unit and one or more characteristics of the destination VIOS.

15. The computer program product of claim 14, wherein the one or more characteristics of the logical storage unit includes a storage block input/output rate and a storage block size and the one or more characteristics of the destination VIOS includes an available storage space and a processor speed.

* * * * *